United States Patent

Jeol et al.

(10) Patent No.: US 9,018,292 B2
(45) Date of Patent: Apr. 28, 2015

(54) HEAT-STABILIZED POLYAMIDE COMPOSITION

(75) Inventors: Stéphane Jeol, Lyons (FR); Thierry Badel, Lyons (FR); Hae-Young Kim, Caluire (FR); Franco Speroni, Milan (IT)

(73) Assignee: Rhodia Operations, Aubervilliers (FR)

(*) Notice: Subject to any disclaimer, the term of this patent is extended or adjusted under 35 U.S.C. 154(b) by 0 days.

(21) Appl. No.: 13/877,886

(22) PCT Filed: Sep. 28, 2011

(86) PCT No.: PCT/EP2011/066909
§ 371 (c)(1),
(2), (4) Date: Jun. 11, 2013

(87) PCT Pub. No.: WO2012/045636
PCT Pub. Date: Apr. 12, 2012

(65) Prior Publication Data
US 2013/0253115 A1    Sep. 26, 2013

(30) Foreign Application Priority Data

Oct. 5, 2010 (FR) .................................... 10 58036

(51) Int. Cl.
| C08K 5/05  | (2006.01) |
| C08L 77/06 | (2006.01) |
| C08L 77/00 | (2006.01) |
| C08K 3/16  | (2006.01) |
| C08K 5/053 | (2006.01) |
| C08K 7/14  | (2006.01) |
| C08L 23/08 | (2006.01) |
| C08L 23/16 | (2006.01) |
| C08L 51/06 | (2006.01) |
| C08K 5/06  | (2006.01) |

(52) U.S. Cl.
CPC . C08L 77/06 (2013.01); C08K 3/16 (2013.01); C08K 5/053 (2013.01); C08K 7/14 (2013.01); C08L 23/08 (2013.01); C08L 23/16 (2013.01); C08L 51/06 (2013.01); C08L 77/00 (2013.01); C08K 5/06 (2013.01)

(58) Field of Classification Search
USPC ........................................ 524/387, 386, 388
See application file for complete search history.

(56) References Cited

U.S. PATENT DOCUMENTS

| 6,160,080 A    | 12/2000 | Cucinella et al. |
| 6,525,166 B1   | 2/2003  | Di Silvestro et al. |
| 2008/0241562 A1* | 10/2008 | Bushelman et al. ....... 428/474.9 |

FOREIGN PATENT DOCUMENTS

| WO | 97/24388 A1    | 7/1997  |
| WO | 99/64496 A1    | 12/1999 |
| WO | 2010/014790 A1 | 2/2010  |
| WO | 2010/014801 A1 | 2/2010  |
| WO | 2011/014548 A2 | 2/2011  |

OTHER PUBLICATIONS

International Search Report issued on Nov. 16, 2011, by the European Patent Office as the International Searching Authority in corresponding International Patent Application No. PCT/EP2011/066909.

* cited by examiner

*Primary Examiner* — Edward Cain
(74) *Attorney, Agent, or Firm* — Dentons US LLP

(57) ABSTRACT

A polyamide composition is described that is stabilized with respect to heat. The composition can have a polyhydric alcohol-based stabilization system that is excellent in maintaining mechanical properties after exposure to heat. Also described, is a process for producing these compositions, and the use of these compositions for making various articles.

13 Claims, No Drawings

HEAT-STABILIZED POLYAMIDE COMPOSITION

CROSS-REFERENCE TO PRIOR APPLICATIONS

This application is a National Stage of PCT/EP2011/066909, filed Sep. 28, 2011, and designating the United States (published in French on Apr. 12, 2012, as WO 2012/045636 A1), which claims priority under 35 U.S.C. §119 to FR 1058036, filed Oct. 5, 2010, each hereby expressly incorporated by reference in its entirety and each assigned to the assignee hereof.

The invention relates to a polyamide composition which is stabilized with respect to heat, comprising a polyhydric alcohol-based stabilization system, which is excellent in maintaining the mechanical properties after exposure to heat. The invention also relates to a process for producing these compositions, and in particular to the use of these compositions for making various articles.

Polyamide is a synthetic polymer widely used for the production of various articles, such as molded and/or injection-molded parts. Polyamide can undergo degradations when it is subjected to external elements or conditions such as UV rays, heat and/or inclement weather. Degradations can also be induced by the heat used during production thereof and/or forming thereof. This instability is reflected by degradations, loss of mechanical properties, and changes in color. These problems can become critical for a certain number of applications, such as, in particular, parts in the automobile industry which are in particular subjected to considerable heat.

In order to improve the stability of polyamides with respect to heat, it is known practice to combine them with particular stabilizers. Many additives are sold for this purpose. The use of copper iodide, in particular in combination with potassium iodide, which is used in most cases and which provides good stabilization properties, is, for example, known. It is also known practice to use more complex additives, such as hindered phenolic antioxidant compounds, stabilizers having at least one hindered amine unit of a HALS type, or phosphorus-containing stabilizers.

However, there is a need to obtain polyamide compositions which are even more effective in terms of stabilization with respect to heat, and which are less expensive.

The applicant has developed a novel polyamide composition which makes it possible to obtain excellent maintenance of mechanical properties after lengthy exposure to heat.

The present invention thus relates to the use of an impact modifier for increasing the thermo-oxidative resistance of a polyamide composition comprising a polyhydric alcohol comprising from 2 to 8 hydroxyl groups.

The present invention also relates to a composition comprising at least:
one thermoplastic polyamide resin;
from 3-10% by weight of impact modifiers; and
one polyhydric alcohol comprising from 2 to 8 hydroxyl groups.

The proportion by weight is expressed relative to the total weight of the composition.

The polyamide of the invention is in particular selected from the group consisting of polyamides obtained by polycondensation of at least one aliphatic dicarboxylic acid with an aliphatic or cyclic or cycloaliphatic or arylaliphatic diamine such as PA 6.6, PA 6.10, PA 6.12, PA 10.10, PA 10.6, PA 12.12, PA 4.6, MXD 6 or PA 92, or between at least one aromatic dicarboxylic acid and an aliphatic or aromatic diamine, such as polyterephthalamides, polyisophthalamides or polyaramides, or a blend thereof and (co)polyamides thereof. The polyamide of the invention can also be selected from polyamides obtained by polycondensation of at least one amino acid or lactam with itself, it being possible for the amino acid to be generated by hydrolytic opening of a lactam ring, such as, for example, PA 6, PA 7, PA 11, PA 12 or PA 13, or a blend thereof and (co)polyamides thereof. Mention may in particular be made of polyamide 6/66 as type of copolyamide.

Semi-crystalline aliphatic or semi-aromatic polyamides are in particular preferred.

Polyamides of type 6 and polyamides of type 66 are particularly preferred. The term "polyamide of type 6" means in particular a polyamide comprising at least 90% by weight of caprolactam or aminocaproic monomer residues. The term "polyamide of type 66" in particular means a polyamide comprising at least 90% by weight of adipic acid and hexamethylenediamine monomer residues.

The polyamides can have an apparent melt viscosity of between 10 and 1200 Pa·s, measured according to the ISO 11443 standard at a shear rate of $1000\ s^{-1}$ and a temperature of 250° C., in particular for polyamides of type 6; or an apparent melt viscosity of between 10 and 700 Pa·s, measured according to the ISO 11443 standard at a shear rate of $1000\ s^{-1}$ and a temperature of 280° C., in particular for polyamides of type 66.

In particular, it is possible to use polyamides of variable molecular weights by addition, before or during the polymerization of the polyamide monomers, or else in melt extrusion, of monomers that modify the length of the chains such as, in particular, difunctional and/or monofunctional compounds having amine or carboxylic acid functions capable of reacting with the polyamide monomers or the polyamide.

The term "carboxylic acid" means carboxylic acids and the derivatives thereof, such as the acid anhydrides, the acid chlorides and the esters, for example. The term "amine" means amines and the derivatives thereof capable of forming an amide bond.

It is possible to use, at the start of, during or at the end of the polymerization, any type of aliphatic or aromatic monocarboxylic or dicarboxylic acid or any type of aliphatic or aromatic monoamine or diamine amine.

Use may very particularly be made of a polyamide obtained at least from adipic acid and hexamethylenediamine or salts thereof such as hexamethylenediamine adipate, which can optionally comprise various proportions of other polyamide monomers. To this effect, mention may be made of polyamide 66/6T.

Polyamides according to the invention may also be obtained by blending, in particular melt blending. It is possible, for example, to blend one polyamide with another polyamide, or one polyamide with a polyamide oligomer, or else one polyamide with monomers that modify the length of the chains, such as, in particular, diamines, dicarboxylic acids, monoamines and/or monocarboxylic acids. It is possible, in particular, to add isophthalic acid, terephthalic acid or benzoic acid, for example at contents of approximately 0.2% to 2% by weight, to the polyamide.

The composition of the invention can also comprise copolyamides derived in particular from the above polyamides, or the blends of these polyamides or (co)polyamides.

Use may also be made of branched polyamides of high fluidity, in particular obtained by blending, during polymerization, in the presence of the polyamide monomers, at least one multifunctional compound comprising at least 3 identical reactive functions of amine function or carboxylic acid function type.

Use may also be made, as a polyamide of high fluidity, of a star polyamide comprising star macromolecular chains and, where appropriate, linear macromolecular chains. Polymers comprising such star macromolecular chains are, for example, described in documents WO 97/24388 and WO 99/64496.

These star polyamides are in particular obtained by blending, during polymerization, in the presence of the polyamide monomers, an amino acid or lactam such as caprolactam, at least one multifunctional compound comprising at least 3 identical reactive functions of amine function or carboxylic acid function type. The term "carboxylic acid" means carboxylic acids and the derivatives thereof, such as the acid anhydrides, the acid chlorides and the esters, for example. The term "amine" means amines and the derivatives thereof capable of forming an amide bond.

The composition can comprise, in addition to the modified polyamide of the invention, one or more other polymers, preferably polyamides or copolyamides.

The composition according to the invention can comprise between 20% and 80% by weight, preferentially between 20% and 70% by weight and more preferentially between 35% and 65% by weight of polyamide, relative to the total weight of the composition.

Reinforcing or bulking fillers are fillers conventionally used for the production of polyamide compositions. Mention may in particular be made of reinforcing fibrous fillers, such as glass fibers, carbon fibers or organic fibers, non-fibrous fillers such as particulate or lamellar fillers and/or exfoliable or non-exfoliable nanofillers, for instance alumina, carbon black, clays, zirconium phosphate, kaolin, calcium carbonate, copper, diatomaceous earths, graphite, mica, silica, titanium dioxide, zeolites, talc, wollastonite, polymeric fillers, such as, for example, dimethacrylate particles, glass beads or glass powder.

Preferably, reinforcing fibers, such as glass fibers, are in particular used. Preferentially, the fiber most widely used is glass fiber, of "chopped" type, having a diameter between 7 and 14 µm and a length of less than 5 mm. These fillers may have a surface size that ensures mechanical adhesion between the fibers and the polyamide matrix.

The composition according to the invention can comprise between 5% and 60% by weight of reinforcing or bulking fillers and preferentially between 10% and 40% by weight, relative to the total weight of the composition.

The composition of the invention thus comprises from 3% to 10% by weight of impact modifiers, relative to the total weight of the composition. This thus means a composition which can comprise only from 3% to 10% by weight of impact modifiers. In other words, the total proportion of impact modifiers, in particular of the system of impact modifiers of the composition, can only be between 3% and 10% by weight in the total composition.

The composition according to the invention comprising the polyamide as defined above comprises at least one impact modifier, that is to say a compound capable of modifying the impact strength of a polyamide composition. These impact modifiers preferentially comprise functional groups which react with the polyamide.

According to the invention, the term "functional groups which react with the polyamide" means groups capable of reacting or of interacting chemically with the acid or amine functions of the polyamide, in particular by covalency, ionic or hydrogen bond interaction or van der Waals bonding. Such reactive groups make it possible to ensure good dispersing of the impact modifiers in the polyamide matrix. Good dispersing is generally obtained with impact modifier particles having a mean size of between 0.1 and 2 µm in the matrix.

Use is preferentially made of impact modifiers comprising functional groups that react with the polyamide as a function of the acid or amine nature of the imbalance $\Delta EG=CEG-AEG$ (concentration of acid end groups CEG minus concentration of amine end groups AEG) of the polyamide. Thus, for example, if the $\Delta EG$ is "acid" (CEG>AEG), use will preferentially be made of reactive functional groups capable of reacting or of interacting chemically with the acid functions of the polyamide, in particular by covalency, ionic or hydrogen bond interaction or van der Waals bonding. If, for example, the $\Delta EG$ is "amine" (AEG>CEG), use will preferably be made of reactive functional groups capable of reacting or of interacting chemically with the amine functions of the polyamide, in particular by covalency, ionic or hydrogen bond interaction or van der Waals bonding. Use is preferentially made of impact modifiers having functional groups which react with the polyamide exhibiting a $\Delta EG$ of "amine" nature.

The impact modifiers can very well comprise in themselves functional groups which react with the polyamide, for example as regards ethylene/acrylic acid (EAA).

It is also possible to add thereto functional groups which react with the polyamide, generally by grafting or copolymerization, for example for ethylene/propylene/diene (EPDM) grafted with maleic anhydride.

Use may be made, according to the invention, of impact modifiers which are oligomeric or polymeric compounds comprising at least one of the following monomers or a mixture thereof: ethylene, propylene, butene, isoprene, diene, acrylate, butadiene, styrene, octene, acrylonitrile, acrylic acid, methacrylic acid, vinyl acetate, vinyl esters, such as acrylic and methacrylic esters and glycidyl methacrylate. These compounds according to the invention can also comprise, in addition, monomers other than those mentioned above.

The base of the impact modifier compound, optionally known as elastomer base, can be selected from the group consisting of: polyethylenes, polypropylenes, polybutenes, polyisoprenes, ethylene/propylene rubbers (EPR), ethylene/propylene/diene (EPDM) rubbers, ethylene and butene rubbers, ethylene and acrylate rubbers, butadiene and styrene rubbers, butadiene and acrylate rubbers, ethylene and octene rubbers, butadiene and acrylonitrile rubbers, ethylene/acrylic acid (EAA) products, ethylene/vinyl acetate (EVA) products, ethylene/acrylic ester (EAE) products, acrylonitrile/butadiene/styrene (ABS) copolymers, styrene/ethylene/butadiene/styrene (SEBS) block copolymers, styrene/butadiene/styrene (SBS) copolymers, core/shell elastomers of methacrylate/butadiene/styrene (MBS) type, or blends of at least two elastomers listed above.

In addition to the groups listed above, these impact modifiers can also comprise, generally grafted or copolymerized, functional groups which react with the polyamide, such as, in particular, the following functional groups: acids, such as carboxylic acids, salified acids, esters in particular, acrylates and methacrylates, ionomers, glycidyl groups, in particular epoxy groups, glycidyl esters, anhydrides, in particular maleic anhydrides, oxazolines, maleimides or their mixtures.

Such functional groups on the elastomers are, for example, obtained by use of a comonomer during the preparation of the elastomer.

Mention may in particular be made, as impact modifiers comprising functional groups which react with the polyamide, of terpolymers of ethylene, acrylic ester and glycidyl methacrylate, copolymers of ethylene and of butyl ester acrylate, copolymers of ethylene, n-butyl acrylate and glycidyl methacrylate, copolymers of ethylene and of maleic anhydride, ethylene/propylene/diene copolymers grafted with maleic anhydride, styrene/maleimide copolymers grafted with maleic anhydride, styrene/ethylene/butylene/styrene copolymers modified with maleic anhydrides, styrene/acrylonitrile copolymers grafted with maleic anhydrides, acrylonitrile/butadiene/styrene copolymers grafted with maleic anhydride, and hydrogenated versions thereof.

The proportion by weight of the impact modifiers in the total composition is in particular between 3% and 10%, preferentially between 4% and 8%, relative to the total weight of the composition, in particular 4, 4.5, 5, 5.5, 6, 6.5, 7, 7.5 and 8 and the values between these intervals.

The composition according to the invention thus comprises a stabilization system comprising at least one polyhydric alcohol comprising from 2 to 8 hydroxyl groups.

It is entirely possible for the composition to comprise a heat stabilization system consisting solely of a polyhydric alcohol comprising from 2 to 8 hydroxyl groups; that is to say in particular without having recourse to other heat stabilizers, such as the CuI and KI pairing, hindered phenolic compounds, stabilizers having at least one hindered amine unit of HALS type, or organic or inorganic phosphorus-containing stabilizers, such as sodium hypophosphite or manganese hypophosphite.

The polyhydric alcohol preferentially has from 3 to 8 hydroxyl groups.

The polyhydric alcohols of the invention can be selected from aliphatic, cycloaliphatic, arylaliphatic and aromatic compounds and can contain one or more heteroatoms, such as oxygen, nitrogen and/or sulfur. The polyhydric alcohols can contain one or more substituents, such as ether, carboxylic acid, amide or ester groups.

As polyhydric alcohols, mention may thus be made of those mentioned in the group consisting of: diols, such as 1,5-pentanediol, 2,2-dimethyl-1,3 propanediol, triethylene glycol, poly(glycol ether)s, triols, for instance glycerol, trimethylolpropane, 2,3-di-(2'-hydroxyethyl)cyclohexan-1-ol, hexane-1,2,6-triol, 1,1,1-tris-(hydroxymethyl)ethane, 3-(2'-hydroxyethoxy)propane-1,2-diol, 3-(2'-hydroxypropoxy)propane-1,2-diol, 2-(2'-hydroxyethoxy)hexane-1,2-diol, 6-(2'-hydroxypropoxy)hexane-1,2-diol, 1,1,1-tris-[(2'-hydroxyethoxy)methyl]ethane, 1,1,1-tris-[(2'-hydroxypropoxy)methyl]propane, 1,1,1-tris-(4'-hydroxyphenyl)ethane, 1,1,1-tris-(hydroxyphenyl)propane, 1,1,3-tris-(dihydroxy-3-methylphenyl)propane, 1,1,4-tris-(dihydroxyphenyl)butane, 1,1,5-tris-(hydroxyphenyl)-3-methylpentane, di-trimethylolpropane, trimethylolpropane ethoxylate, or trimethylolpropane propoxylate; polyols, such as pentaerythritol, dipentaerythritol, and tripentaerythritol; and saccharides such as cyclodextrin, D-mannose, glucose, galactose, sucrose, fructose, xylose, arabinose, D-mannitol, D-sorbitol, D- or L-arabitol, xylitol, iditol, talitol, allitol, altritol, gulitol, erythritol, threitol and D-gulonic-γ-lactone; and similar compounds.

The preferred polyhydric alcohols include those which have at least one pair of hydroxyl groups of which the carbon atoms to which they are respectively bonded are separated by at least one atom, preferentially a carbon or oxygen atom.

Preferentially, the polyhydric alcohol used in the thermoplastic composition is diglycerol, triglycerol, pentaerythritol, dipentaerythritol, tripentaerythritol or di-trimethylolpropane. More preferentially, the polyhydric alcohol used is dipentaerythritol and/or tripentaerythritol.

The composition according to the invention can also comprise additives normally used in the production of polyamide compositions. Thus, mention may be made of lubricants, flame retardants, plasticizers, nucleating agents, catalysts, antioxidants, antistatic agents, colorants, mattifying agents, molding aids or other conventional additives.

These fillers and additives can be added to the modified polyamide by normal means suited to each filler or additive, such as, for example, during the polymerization or in the melt blending.

Preferentially, the composition of the invention comprises at least:
  one thermoplastic polyamide resin;
  from 3-10% by weight of impact modifiers; and
  one polyhydric alcohol comprising from 2 to 8 hydroxyl groups;
  one reinforcing or bulking filler; and
  one additive selected from the group consisting of: lubricants, flame retardants, plasticizers, nucleating agents, catalysts, antioxidants, antistatic agents, colorants, mattifying agents and molding aids.

Preferentially, the composition of the invention consists of:
  a thermoplastic polyamide resin;
  from 3-10% by weight of impact modifiers; and
  a polyhydric alcohol comprising from 2 to 8 hydroxyl groups;
  a reinforcing or bulking filler; and
  an additive selected from the group consisting of: lubricants, flame retardants, plasticizers, nucleating agents, catalysts, antioxidants, antistatic agents, colorants, mattifying agents and molding aids.

The polyamide compositions are generally obtained by blending the various compounds participating in the composition under cold conditions or in the melt.

The process is carried out at more or less high temperature and at more or less high shear force, according to the nature of the various compounds. The compounds can be introduced simultaneously or successively. Use is generally made of an extrusion device in which the material is heated, then melted and subjected to a shear force, and conveyed.

According to a first embodiment, all the compounds are melt-blended during a single operation, for example during an extrusion operation. It is possible, for example, to blend granules of the polymer materials, to introduce them into the extrusion device in order to melt them and to subject them to more or less high shearing. According to specific embodiments, it is possible to preblend some of the compounds, in the melt or not in the melt, before preparation of the final composition.

The composition according to the invention, when it is prepared using an extrusion device, is preferably conditioned in the form of granules. The granules are intended to be formed using processes involving melting in order to obtain articles. The articles are thus constituted of the composition. According to a normal embodiment, the modified polyamide is extruded in the form of rods, for example in a twin-screw extrusion device, which are then chopped into granules. The molded parts are subsequently prepared by melting the granules produced above and feeding the molten composition into forming devices, for example injection-molding devices.

The composition according to the invention can be used in any process for forming plastics, such as, for example, the molding process, in particular injection molding, extrusion, extrusion blow-molding, or else rotomolding.

The present invention also relates to articles obtained by forming the composition according to the invention, for example by extrusion, molding, or injection molding. Articles that may be mentioned include those used in the automobile industry.

Specific terms are used in the description so as to facilitate understanding of the principle of the invention. Nevertheless, it should be understood that no limitation on the scope of the invention is envisioned by the use of these specific terms. The term "and/or" includes the meanings "and" and "or" and all the other possible combinations of elements connected with this term.

Other details or advantages of the invention will become more clearly apparent in the light of the examples below, given solely by way of indication.

EXPERIMENTAL SECTION

Characterizations

Acid end group (CEG) and amine end group (AEG) content: assayed by potentiometry, expressed in meq/kg. Content of chain blocking group (TBG) calculated from the initial amounts of reagents. For example, benzoic acid or acetic acid can be used as chain blockers.

Number-average molar mass Mn determined by the formula $Mn=2 \cdot 10^6/(AEG+CEG+TBG)$ and expressed in g/mol.

Melting point (Mp) and associated enthalpy (ΔHf), and cooling crystallization temperature ($T_c$): are determined by Differential Scanning calorimetry (DSC), using a Perkin Elmer Pyris 1 instrument, at a rate of 10° C./min.

Glass transition temperature ($T_g$) determined on the same instrument at a rate of 40° C./min.

Preparation of a Copolyamide PA 66/6T 65/35 Mol/Mol 58.34 kg (222.4 mol) of N salt (1:1 salt of hexamethylenediamine and adipic acid), 19.9 kg (119.8 mol) of terephthalic acid, 44.06 kg (122.6 mol) of an aqueous solution of hexamethylenediamine at 32.34% by weight, 340.5 g (5.67 mol) of 100% acetic acid, 56 kg of demineralized water and 6.4 g of Silcolapse 5020® antifoam are introduced into a polymerization reactor. The copolyamide 66/6T 65/35 is produced according to a standard process for polymerization of polyamide 66 type with 15 minutes of finishing at 290° C. The polymer obtained is cast in the form of rods, cooled, and formed into granules by cutting up the rods.

The polymer obtained presents the following characteristics: CEG=71.4 meq/kg, AEG=51.4 meq/kg, and TBG=71 meq/kg, i.e. Mn=10 300 g/mol. The polyamide 66/6T 65/35 is semi-crystalline and has the following thermal characteristics: Tg=81.9° C., Tc=248.1° C., Mp=281.9° C.

Extrusions

Before extrusion, the polyamide granules are dried to a water content below 1000 ppm. Formulations are prepared by melt-blending various components and additives in a twin-screw co-rotating Werner & Pleifeder ZSK 40 extruder operating at 40 kg/h and at a speed of 270 rpm. The temperature settings in the 8 zones are respectively: 250, 255, 260, 260, 265, 270, 275, 280° C. All the components in the formulation are added at the start of the extruder. The rod having exited the extruder is cooled in a water tank and cut into the form of granules using a granulator and the granules are packaged in a heat-sealed bag. Before being injection molded, the granules are dried so as to obtain a moisture content of less than 1000 ppm.

The additives used are as follows:
Dipentaerythritol (technical grade) from Sigma Aldrich, known as DPE
CuI and KI from Ajay Europe
OCV 983 glass fibers from Owens Corning Vetrotex (35% by weight)
Elastomer from ExxonMobil Chemical having the reference Exxelor VA1803, an amorphous copolymer based on ethylene and grafted with maleic anhydride (0.5% to 1% by weight)
Carbon black and nigrosin pigment as a masterbatch (0.7% by weight)

Thermal Aging Test

The formulations prepared are injected, on a Demag 50T press at 280° C. with a mold temperature of 80° C., in the form of multifunction test pieces 4 mm thick, in order to characterize the tensile mechanical properties (tensile modulus, stress at break, strain at break—mean obtained on 5 samples) according to the ISO 527/1A standard and the impact mechanical properties (unnotched Charpy—mean obtained on 10 samples) according to the ISO 179-1/1eU standard at 23° C. before and after thermal aging in air.

The thermal aging ventilated in air is carried out by placing the test pieces in a Heraeus TK62120 incubator regulated at 240° C. At various aging times, test pieces are removed from the incubator, cooled to ambient temperature and placed in heat-sealed bags in order to prevent them from taking up any moisture before evaluation of their mechanical properties.

The retention of tensile strength or of impact strength at a given aging time is then defined relative to these same properties before aging. The retention is thus defined as a percentage.

The formulations and properties are collated in the following table 1:

TABLE 1

|  | C1 | C2 | C3 | 1 |
|---|---|---|---|---|
| PA 66/6T (%) | 63.15 | 59.15 | 62.3 | 58.3 |
| DPE (%) | — | — | 2 | 2 |
| CuI/KI (%) | 0.15/1 | 0.15/1 | — | — |
| Exxelor VA1803 Elastomer (%) | — | 4 | — | 4 |
| Before aging |  |  |  |  |
| Tensile modulus (MPa) | 11620 | 11160 | 11770 | 11420 |
| Tensile stress at break (MPa) | 198.8 | 187.7 | 197.6 | 184 |
| Strain at break (%) | 2.6 | 2.6 | 3.5 | 3.4 |
| Charpy notched impact (kJ/m$^2$) | 65 | 81.0 | 80 | 91 |
| After aging for 168 h@ 240° C. |  |  |  |  |
| Retention of Tensile stress at break (%) | 76 | 84 | 105 | 103 |
| Retention of Charpy notched impact (%) | 46 | 51 | 83 | 97 |
| After aging for 336 h@ 240° C. |  |  |  |  |
| Retention of Tensile stress at break (%) | N.M. | N.M. | 99 | 99 |
| Retention of Charpy notched impact (%) | N.M. | N.M. | 65 | 77 |
| After aging for 504 h@ 240° C. |  |  |  |  |
| Retention of Tensile stress at break (%) | 64 | 72 | 80 | 89 |
| Retention of Charpy notched impact (%) | 51 | 46 | 46 | 62 |

N.M.: = not measured

It is thus clearly observed that the presence of the elastomer makes it possible to improve the impact strength before aging in the formulations whatever the nature of the thermal stabilizer used, the CuI/KI mixture or DPE. This is the desired effect. On the other hand, it is observed, entirely surprisingly, that the use of elastomer as a supplement to DPE creates a greater retention of both the tensile mechanical properties and the impact mechanical properties than without elastomer. This is not confirmed experimentally with another type of thermal stabilizer, for instance the CuI/KI mixtures. There is therefore a synergistic effect with the use of mixtures of polyhydric alcohol and of elastomer on the retention of the tensile and impact mechanical properties after thermal aging in air.

The invention claimed is:

1. A composition comprising:
one thermoplastic polyamide resin;
from 3% to 10% by weight of impact modifiers,
wherein said impact modifiers are selected from the group consisting of a copolymer of ethylene grafted with maleic anhydride and an ethylene/propylene/diene copolymer grafted with maleic anhydride; and
wherein the impact modifier comprises functional groups which react with the polyamide; and
a polyhydric alcohol comprising from 2 to 8 hydroxyl groups.

2. The composition as defined by claim 1, wherein the composition comprises from 5% to 60% by weight of reinforcing or bulking fillers, relative to the total weight of the composition.

3. The composition as defined by claim 1, wherein the impact modifier has an elastomer base that is selected from the group consisting of: a polyethylene, a polypropylene, a polybutene, a polyisoprene, an ethylene/propylene rubber (EPR), an ethylene/propylene/diene (EPDM) rubber, an ethylene and butene rubber, an ethylene and acrylate rubber, a butadiene and styrene rubber, a butadiene and acrylate rubber, en ethylene and octene rubber, a butadiene and acrylonitrile rubber, an ethylene/acrylic acid (EAA) product, an ethylene/vinyl acetate (EVA) product, an ethylene/acrylic ester (EAE) product, an acrylonitrile/butadiene/styrene (ABS) copolymer, a styrene/ethylene/butadiene/styrene block (SEBS) copolymer, a styrene/butadiene/styrene (SBS) copolymer, a core/shell elastomer of methacrylate/butadiene/styrene (MBS) type, and a blend of at least two elastomers listed above.

4. The composition as defined by claim 1, wherein the composition comprises from 4% to 8% of impact modifiers, relative to the total weight of the composition.

5. The composition as defined by claim 1, wherein the composition comprises a heat stabilization system consisting solely of one polyhydric alcohol comprising from 2 to 8 hydroxyl groups.

6. The composition as defined by claim 1, wherein the polyhydric alcohol has from 3 to 8 hydroxyl groups.

7. The composition as defined by claim 1, wherein the polyhydric alcohol is selected from the group consisting of: a dial, a triol, a polyol, and a saccharide.

8. The composition as defined by claim 1, wherein the polyhydric alcohol has at least one pair of hydroxyl groups of which the carbon atoms to which they are respectively bonded are separated by at least one atom.

9. The composition as defined by claim 1, wherein the polyhydric alcohol is selected from the group consisting of: a diglycerol, a triglyceryl, a pentaerythritol, a dipentaerythritol, a tripentaerythritol and a di-trimethylpropane.

10. The composition as defined by claim 7, wherein the polyhydric alcohol comprises a diol that is selected from the group consisting of 1,5-pentanediol, 2,2-dimethyl-1,3 propanediol, triethylene glycol, and a poly(glycol ether).

11. The composition as defined by claim 7, wherein the triol is selected from the group consisting of glycerol, trimethylolpropane, 2,3-di-(2'-hydroxyethyl)cyclohexan-1-ol, hexane-1,2,6-triol, 1,1,1-tris-(hydroxymethyl)ethane, 3-(2'-hydroxyethoxy)propane-1,2-diol, 3-(2'-hydroxypropoxy)propane-1,2-diol, 2-(2'-hydroxyethoxy)hexane-1,2-diol, 6-(2'-hydroxypropoxy)hexane-1,2-diol, 1,1,1-tris-[(2'-hydroxyethoxy)methyl]ethane, 1,1,1-tris-[(2'-hydroxypropoxy)methyl]propane, 1,1,1-tris-(4'-hydroxyphenyl)ethane, 1,1,1-tris-(hydroxyphenyl)propane, 1,1,3-tris-(dihydroxy-3-methylphenyl)propane, 1,1,4-tris-(dihydroxyphenyl)butane, 1,1,5-tris-(hydroxyphenyl)-3-methylpentane, di-trimethylopropane, trimethylolpropane ethoxylate, or trimethylolpropane propoxylate.

12. The composition as defined by claim 7, wherein the polyol is selected from the group consisting of pentaerythritol, dipentaerythritol, and tripentaerythritol.

13. The composition as defined by claim 7, wherein the saccharide is selected from the group consisting of cyclodextrin, D-mannose, glucose, galactose, sucrose, fructose, xylose, arabinose, D-mannitol, D-sorbitol, D- or L-arabitol, xylitol, iditol, talitol, allitol, altritol, gulitol, erythritol, threitol and D-gulonic-γ-lactone.

* * * * *